(12) United States Patent
Chen et al.

(10) Patent No.: US 11,663,752 B1
(45) Date of Patent: May 30, 2023

(54) AUGMENTED REALITY PROCESSING DEVICE AND METHOD

(71) Applicant: INSTITUTE FOR INFORMATION INDUSTRY, Taipei (TW)

(72) Inventors: Jhih-Rong Chen, Taipei (TW); Jia-Wei Hong, Taipei (TW); Ming-Fang Weng, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 17/575,649

(22) Filed: Jan. 14, 2022

(30) Foreign Application Priority Data

Nov. 10, 2021 (TW) .................................. 110141920

(51) Int. Cl.
| | |
|---|---|
| *G06T 11/00* | (2006.01) |
| *G06T 7/73* | (2017.01) |
| *G06V 10/44* | (2022.01) |
| *G06T 7/33* | (2017.01) |
| *G06T 3/00* | (2006.01) |
| *G06F 18/22* | (2023.01) |

(52) U.S. Cl.
CPC .............. *G06T 11/00* (2013.01); *G06F 18/22* (2023.01); *G06T 3/0056* (2013.01); *G06T 7/337* (2017.01); *G06T 7/73* (2017.01); *G06V 10/443* (2022.01); *G06T 2210/56* (2013.01)

(58) Field of Classification Search
CPC ....... A61C 8/00; G06F 2113/20; G06F 3/011; G06F 30/17; G06V 10/751
See application file for complete search history.

(56) References Cited

U.S. PATENT DOCUMENTS

| | | | |
|---|---|---|---|
| 11,030,526 B1* | 6/2021 | Goodsitt | G06N 20/20 |
| 2020/0348767 A1* | 11/2020 | Araújo | G06F 3/014 |
| 2021/0113174 A1* | 4/2021 | Xu | A61B 6/4452 |
| 2021/0319625 A1* | 10/2021 | Goodrich | G06T 5/005 |

\* cited by examiner

*Primary Examiner* — Ming Wu
(74) *Attorney, Agent, or Firm* — CKC & Partners Co., LLC

(57) ABSTRACT

An augmented reality processing device is provided, comprising an image capturing circuit and a processor. The processor is connected to the image capturing circuit, and execute operations of: generating an original point cloud image according to the first environment image and a physical object in the first environment image; generating an expanded point cloud image corresponding to the physical object from the second environment image according to the first environment image and the physical object point cloud set, and generating a superimposed point cloud image according to the expanded point cloud image and the original point cloud image; and generating a transformation matrix according to the original point cloud image and the expanded point cloud image, and superimposing a virtual object to the second environment image according to the superimposed point cloud image and the transformation matrix.

20 Claims, 3 Drawing Sheets

AUGMENTED REALITY PROCESSING DEVICE AND METHOD

CROSS-REFERENCE TO RELATED APPLICATION

This application claims priority to Taiwan Application Serial Number 110141920, filed Nov. 10, 2021, which is herein incorporated by reference in its entirety.

BACKGROUND

Field of Invention

The present invention relates to an image processing technology. More particularly, the present invention relates to an augmented reality processing device and method.

Description of Related Art

On head-mounted display (HMD) devices and other near-eye display devices, one or more display panels installed in front of the user's eyes are usually used to display various types of content, including augmented reality (AR) content and the like. However, when it is necessary to superimpose virtual objects on the same physical object, changes in a capturing environment often cause difficulties in superimposing the virtual objects on the same physical object.

SUMMARY

The invention provides an augmented reality processing device, comprising an image capturing circuit and a processor. The image capturing circuit is configured to capture a first environment image and a second environment image. The processor is connected to the image capturing circuit, and execute operations of: generating an original point cloud image according to the first environment image and a physical object in the first environment image, wherein the original point cloud image comprises a physical object point cloud set and a physical scene point cloud set which correspond to the physical object, wherein a virtual object is superimposed with the physical object according to the physical object point cloud set; generating a first physical object feature set corresponding to the physical object point cloud set according to the first environment image and the physical object point cloud set; generating an expanded point cloud image corresponding to the physical object from the second environment image according to the first physical object feature set, and generating a superimposed point cloud image according to the expanded point cloud image and the original point cloud image; and generating a transformation matrix according to the original point cloud image and the expanded point cloud image, and superimposing the virtual object to the second environment image according to the superimposed point cloud image and the transformation matrix.

The disclosure provides an augmented reality processing method, comprising: capturing a first environment image and a second environment image, and generating an original point cloud image according to the first environment image and a physical object in the first environment image, wherein the original point cloud image comprises a physical object point cloud set and a physical scene point cloud set which correspond to the physical object, wherein a virtual object is superimposed with the physical object according to the physical object point cloud set; generating a first physical object feature set corresponding to the physical object point cloud set according to the first environment image and the physical object point cloud set; generating an expanded point cloud image corresponding to the physical object from the second environment image according to the first physical object feature set, and generating a superimposed point cloud image according to the expanded point cloud image and the original point cloud image; and generating a transformation matrix according to the original point cloud image and the expanded point cloud image, and superimposing the virtual object to the second environment image according to the superimposed point cloud image and the transformation matrix.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
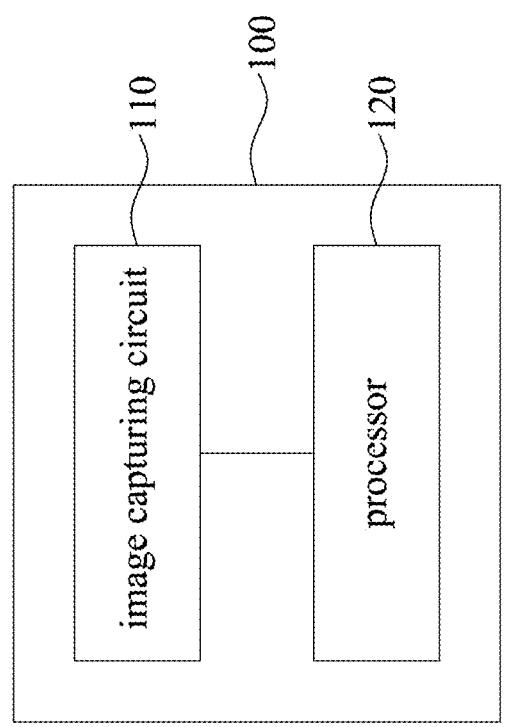
FIG. 1 is a block diagram of an augmented reality processing device of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, which is a block diagram of an augmented reality processing device 100 of the present disclosure. In one embodiment, the augmented reality processing device 100 includes an image capturing circuit 110 and a processor 120. The image capturing circuit 110 is utilized to capture images of any environment. The processor 120 is connected to the image capturing circuit 110.

In some embodiments, the augmented reality processing device 100 can be implemented by a computer, a server, a head-mounted display device, a mobile phone, smart glasses, a mixed reality, or a processing center. In some embodiments, the image capturing circuit 110 can be a camera for capturing images or a camera that can continuously take pictures. In some embodiments, the processor 120 can be implemented by a processing unit, a central processing unit, or a computing unit.

In some embodiments, the augmented reality processing device 100 is not limited to including the image capturing circuit 110 and the processor 120, and the augmented reality processing device 100 can further include other components required for operation and applications. For example, the augmented reality processing device 100 can further include an output interface (e.g., a display panel for displaying information) and an input interface (e.g., a touch panel, a keyboard, a microphone, a scanner, or a flash memory reader), an input interface (e.g., a touch panel, a keyboard, a microphone, a scanner or a flash memory reader) and a communication circuit (e.g., a WiFi communication model, a Bluetooth communication model, a wireless telecommunication network communication model, etc.).

Figure 2:
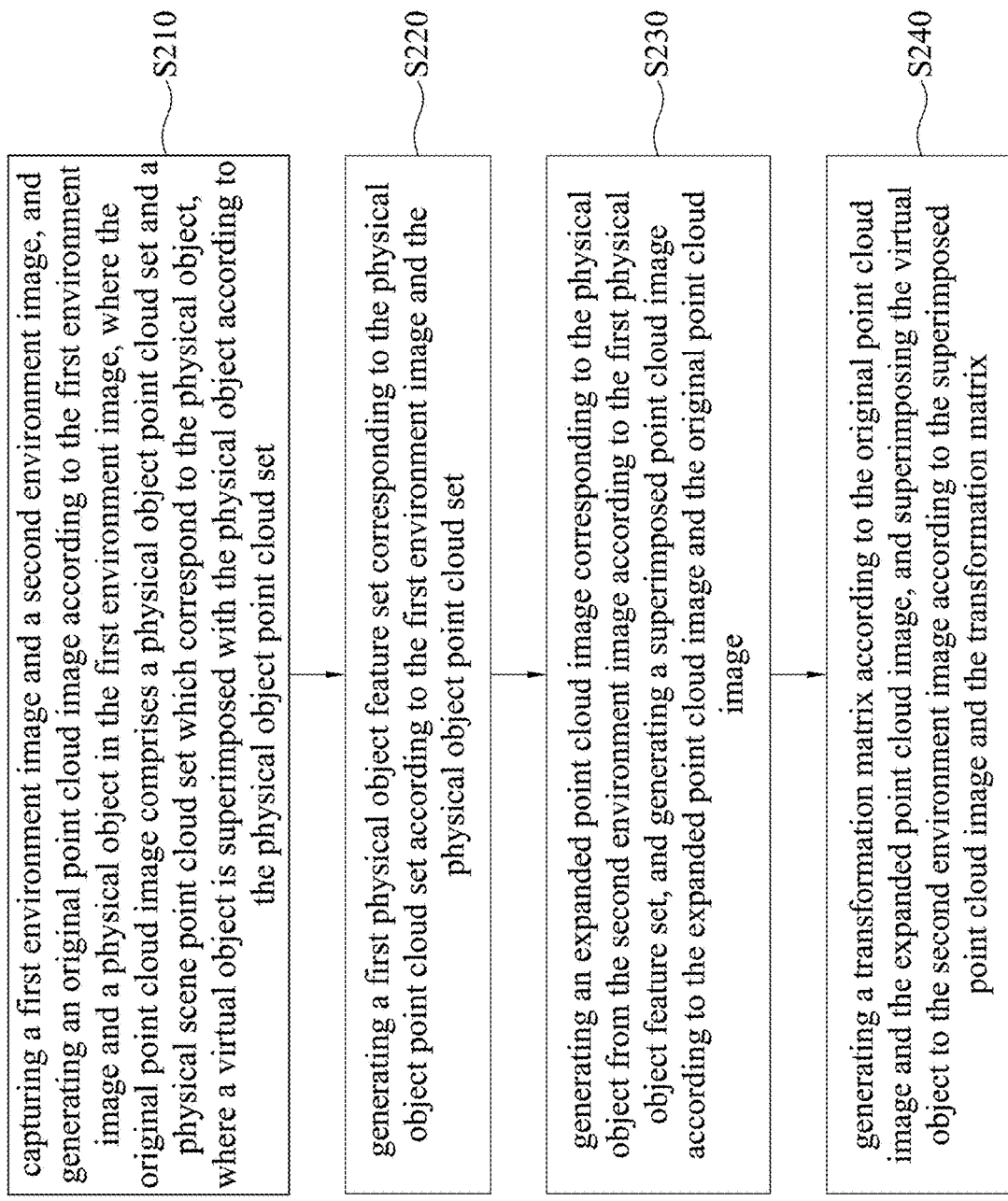
FIG. 2 is a flowchart of an augmented reality processing method of the present disclosure.

Reference is made to FIG. 2, which is a flowchart of an augmented reality processing method of the present disclosure. The method of the embodiment shown in FIG. 2 is applicable to the augmented reality processing device 100 of FIG. 1, but is not limited to this. For the sake of convenience and clarity, detailed steps of the augmented reality processing method shown in FIG. 2 will be described in the following with reference to FIG. 1 and FIG. 2 at the same time, using the operational relationship between the components in the augmented reality processing device 100.

In an embodiment, the augmented reality processing method includes steps S210 to S240, and is executed by the processor 120. Firstly, in step S210, capturing a first environment image and a second environment image, and generating an original point cloud image according to the first environment image and a physical object in the first environment image, where the original point cloud image comprises a physical object point cloud set and a physical scene point cloud set which correspond to the physical object, where a virtual object is superimposed with the physical object according to the physical object point cloud set.

In some embodiments, the first environment image and the second environment image respectively correspond to a first capturing time and a second capturing time, where the first capturing time is before the second capturing time.

In some embodiments, images can be continuously captured by the image capturing circuit 110, and multiple key frame images can be selected from the captured images. Then, the first environment image and the second environment image corresponding to the first capturing time and the second capturing time respectively can be captured from the multiple key frame images, where the first environment image and the second environment image correspond to different environments. For example, the first environment image can be an image captured on a desk in a study room, and the second environment image can be an image captured on a bed in a bedroom.

In some embodiments, a random sampling method can be executed to select the multiple key frame images from the multiple captured images. In some embodiments, the physical object can be a mobile phone box, a teacup box, or the like.

In some embodiments, the simultaneous localization and mapping (SLAM) technology can be executed to execute scene scanning algorithms (e.g., structure for motion (SFM) algorithms) on the first environment image and the physical object in the first environment image, so as to generate the original point cloud image. For example, the first environment image can include multiple continuous images of the physical object captured by the image capturing circuit 110 from multiple shooting angles in a specific environment. Therefore, the SFM algorithms can be executed on these images to calculate spatial positions of multiple point clouds, so the original point cloud images can be generated according to the spatial positions of these point clouds.

In some embodiments, the SLAM technology can be executed on the second environment image to determine whether the above-mentioned physical object exists. For example, the second environment image can be a single image of the physical object captured by the image capturing circuit 110 from a specific shooting angle in another specific environment. Therefore, a TrackWithMotionModel function, a TrackReferenceKeyFrame function or a Relocalization function in the SLAM technology can be utilized to execute object positioning algorithms on the entire second environment image to determine whether the physical object exists in the second environment image.

In some embodiments, when it is determined that no physical object exists in the second environment image, a new key frame image can be kept on captured by the image capturing circuit 110 as the second environment image until it is determined that the physical object exists in the second environment image.

Furthermore, in step S220, generating a first physical object feature set corresponding to the physical object point cloud set according to the first environment image and the physical object point cloud set.

In some embodiments, oriented fast and rotated brief (ORB) algorithms can be executed according to the first environment image and the physical object point cloud set to generate the first physical object feature set corresponding to the physical object point cloud set, where the ORB algorithms include feature extraction and feature point description methods.

In some embodiments, the ORB algorithms can be executed on the first environment image to generate the first environment feature set (i.e., the ORB algorithms is executed on all pixels of the entire first environment image), and a feature set corresponding to the physical object point cloud set can be selected from the first environment feature set as the first physical object feature set, where the first physical object feature set is a feature set of a area corresponding to the physical object in the first environment image.

Furthermore, in step S230, generating an expanded point cloud image corresponding to the physical object from the second environment image according to the first physical object feature set, and generating a superimposed point cloud image according to the expanded point cloud image and the original point cloud image.

In some embodiments, an object area of the physical object in the second environment image is identified according to the first physical object feature set, and the expanded point cloud image corresponding to the physical object is generated from the object area.

In some embodiments, the ORB algorithms can be executed on the second environment image to generate a second environment feature set, and a feature set corresponding to the first physical object feature set is selected from the second environment feature set to make an area corresponding to the selected feature set in the second environment image as the object area.

In some embodiments, the SLAM technology can be executed on the object area to generate the expanded point cloud image corresponding to the physical object. In some embodiments, the expanded point cloud image can be superimposed to a position corresponding to the object area in the original point cloud image to generate the superimposed point cloud image.

In some embodiments, the ORB algorithms can be executed on the second environment image to generate the second environment feature set (i.e., the ORB algorithm is executed on all pixels of the entire second environment image), and a feature set corresponding to the first environment feature set is selected from the second environment feature set as the similar feature set. Then, the SLAM technology is executed on a position corresponding to the similar feature set in the second environment image to generate a candidate point cloud image, and a point cloud set corresponding to the first physical object feature set is selected from the candidate point cloud image to generate the expanded point cloud image.

Furthermore, in step S240, generating a transformation matrix according to the original point cloud image and the expanded point cloud image, and superimposing the virtual object to the second environment image according to the superimposed point cloud image and the transformation matrix.

In some embodiments, the iterative closest point (ICP) algorithms or feature based registration algorithms can be executed on the physical object point cloud set and the expanded point cloud image to generate the transformation matrix.

In some embodiments, a point cloud correspondence relationship between the physical object point cloud set and the expanded point cloud image can be established according to the first physical object feature set and the second physical object feature set. Then, the transformation matrix can be generated according to the point cloud correspondence relationship, the physical object point cloud set and the expanded point cloud image.

In some embodiments, the ORB algorithms can be executed on the object area in the second environment image to generate the second physical object feature set corresponding to the physical object.

In some embodiments, a first point cloud feature set corresponding to the physical object point cloud set can be selected from the first physical object feature set, and a second point cloud feature set corresponding to the expanded point cloud image can be selected from the second physical object feature set. Then, the point cloud correspondence relationship between the physical object point cloud set and the expanded point cloud image can be established according to the first point cloud feature set and the second point cloud feature set.

In some embodiments, the transformation matrix may be utilized to execute geometric transformation on the expanded point cloud image to generate an adjusted expanded point cloud image, and distance function processing can be executed according to the adjusted expanded point cloud image and the expanded point cloud image to generate a distance value. Then, whether an adjusted transformation matrix is generated according to the point cloud correspondence relationship, the physical object point cloud set and the adjusted expansion point cloud image can be determined according to the distance value and the distance threshold, so the virtual object is superimposed on the second environment image according to the superimposed point cloud image and the adjusted transformation matrix.

In some embodiments, a barycenter position corresponding to the physical object point cloud set and a barycenter position corresponding to the expanded point cloud image can be calculated according to the physical object point cloud set and the expanded point cloud image. Then, the transformation matrix can be generated according to the point cloud correspondence relationship, the barycenter position corresponding to the physical object point cloud set, and the barycenter position corresponding to the expanded point cloud image.

In some embodiments, point cloud barycenter algorithms of point cloud library (PCL) can be executed according to the physical object point cloud set and the expanded point cloud image to calculate the barycenter position corresponding to the physical object point cloud set and the barycenter position corresponding to the expanded point cloud image.

In some embodiments, a barycenter coordinate of the physical object point cloud set and a barycenter coordinate of the expanded point cloud image can be calculated according to the barycenter position corresponding to the physical object point cloud set and the barycenter position corresponding to the expanded point cloud image respectively. Then, the transformation matrix can be generated according to the barycenter coordinate of the physical object point cloud set and the barycenter coordinate of the expanded point cloud image, where the transformation matrix indicates relationship of translation and rotation between the physical object point cloud set and the expanded point cloud image.

In some embodiments, the transformation matrix can be utilized to execute the geometric transformation on the virtual object, so as to generate a transformed virtual object, and the transformed virtual object is superimposed on the second environment image according to the superimposed point cloud image.

Through the above steps, the augmented reality processing device 100 can directly utilize the original point cloud image of the original environment to expand the point cloud when the environment of the physical object changes, so as to perform augmented reality on the physical object. In this way, it will save a lot of time and resources for the establishment of the point cloud image of the new environment.

Figure 3:
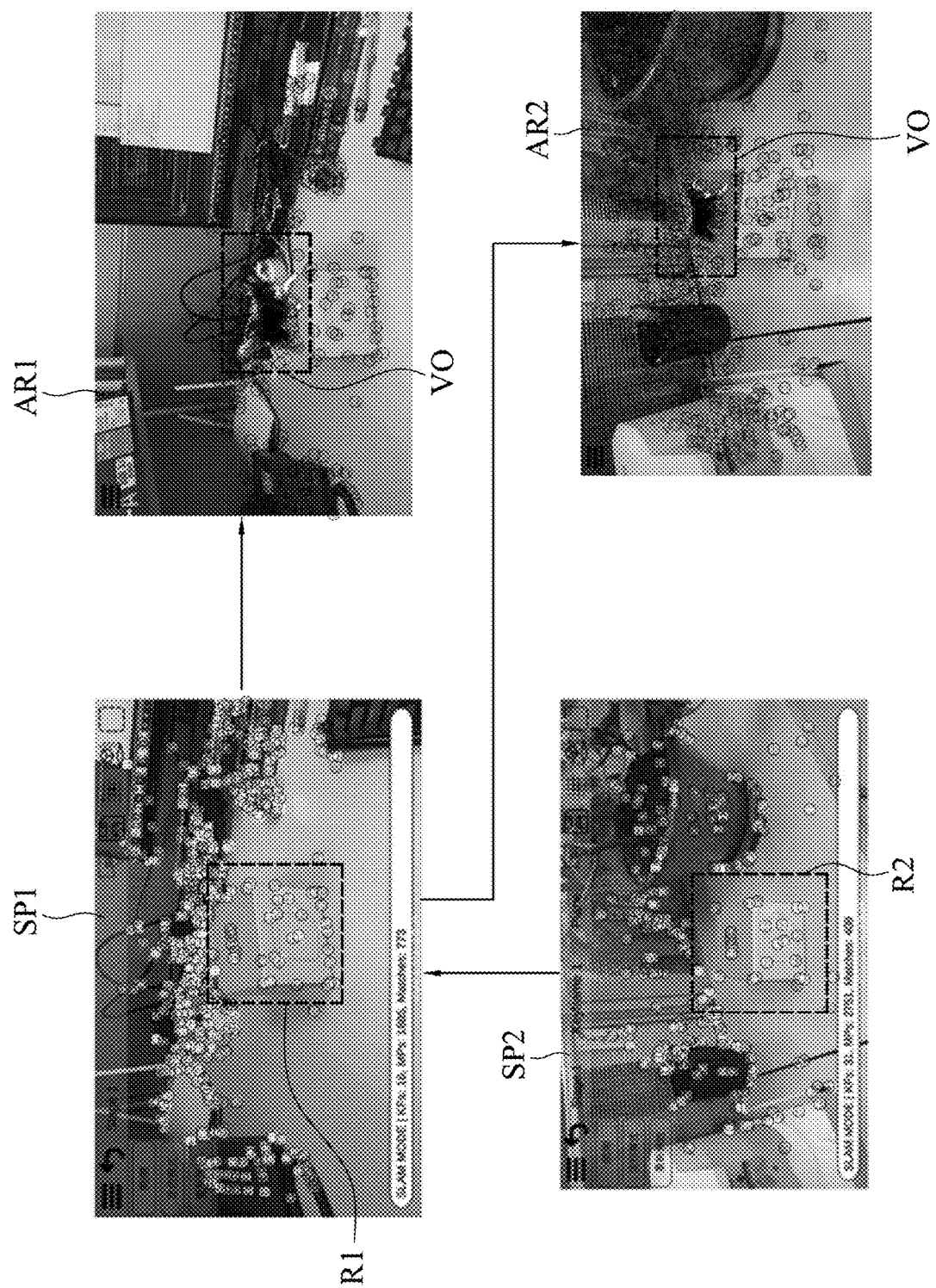
FIG. 3 is a schematic diagram of executing augmented reality according to some embodiments of the present disclosure.

Hereinafter, the above-mentioned augmented reality processing method will be further described with an actual example. Reference is made to FIG. 3, which is a schematic diagram of executing augmented reality according to some embodiments of the present disclosure.

Firstly, the above-mentioned original point cloud image can be superimposed on the image corresponding to the specific shooting angle in the first environment image to generate a first superimposed image SP1, and the candidate point cloud image is superimposed on the second environment image to generate a second superimposed image SP2.

Furthermore, the physical object to be superimposed with the virtual object VO (i.e., a virtual image of a dog) can be selected in the first superimposed image SP1, and a first area R1 corresponding to the physical object can be selected. In this way, the virtual object VO can be superimposed on the physical object in the first area R1 by these point clouds in the first area R1 to generate a first augmented reality image AR1.

Furthermore, a feature set corresponding to these point clouds in the first area R1 in the first environment feature set can be made as the first physical object feature set, and a feature set corresponding to the first physical object feature set is selected from the second environmental feature set as the second physical object feature set, so a second area R2 of point clouds corresponding to the second physical object feature set is selected from the candidate point cloud image as the area which the virtual object VO will be superimposed on the physical object (if point clouds outside this area is deleted, point clouds in this area can be regarded as the above-mentioned expanded point cloud image).

In this way, the point cloud correspondence relationship between a point cloud set in the first area R1 and a point cloud set in the second area R2 can be identified according to the first physical object feature set and the second physical object feature set (i.e., point clouds with similar features can have correspondence relationships).

Furthermore, a barycenter position of the point cloud set in the first region R1 and a barycenter position of the point cloud set in the second region R2 can be calculated respectively, and a barycenter coordinate of the point cloud set in the first region R1 and a barycenter coordinate of the point cloud set in the second region R2 can be calculated according to these barycenter positions. Then, the transformation matrix indicating the relationship of translation and rotation between the point clouds can be generated according to the barycenter coordinate of the physical object point cloud set and the barycenter coordinate of the expanded point cloud image.

Furthermore, the transformation matrix can be utilized to execute geometric transformation on the point cloud set in the second region R2, and a squared distance sum is calculated for the adjusted point cloud set and the unadjusted point cloud set to generate a distance value. Then, the adjusted transformation matrix can be generated according to the point cloud correspondence relationship, the physical object point cloud set and the adjusted expanded point cloud image.

In this way, whether the adjusted transformation matrix is generated according to the point cloud correspondence relationship, the point cloud set in the first area R1 and the adjusted point cloud set in the second area R2 in the same way as described above can be determined according to the distance value and the distance threshold, and a new distance value can be calculated here. Then, an absolute difference between the above-mentioned distance value and the new distance value can be calculated, and whether the absolute difference is not less than a difference threshold can be determined. When the absolute difference is not less than the difference threshold, the same steps described above can be kept on repeat to update the transformation matrix and calculate a new absolute difference until the absolute difference is less than the difference threshold or a number of times which the absolute difference is calculated equals a number threshold.

Furthermore, the point cloud set in the second area R2 can be superimposed to the object area corresponding to the physical object in the second environmental image in the original point cloud image to generate a superimposed point cloud image, and the virtual object VO originally superimposed on the first augmented reality image AR1 is geometrically transformed by the transformation matrix. Then, the transformed virtual object VO can be superimposed to the second environment image according to the superimposed point cloud image, and the superimposed point cloud image is also superimposed to the second environment image, thereby generating a second augmented reality image AR2.

In summary, the augmented reality processing device and method of the embodiments of the present disclosure can superimpose virtual objects on physical objects in images, and when the environment of the physical object is changed, the point cloud matching method is utilized to calculate the transformation matrix of the virtual object. In this way, it is possible to superimpose the virtual images without directly creating a point cloud image for the new environment, saving a lot of time and computing resources.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An augmented reality processing device, comprising:
   an image capturing circuit, configured to capture a first environment image and a second environment image; and
   a processor, connected to the image capturing circuit, and execute operations of:
      generating an original point cloud image according to the first environment image and a physical object in the first environment image, wherein the original point cloud image comprises a physical object point cloud set and a physical scene point cloud set which correspond to the physical object, wherein a virtual object is superimposed with the physical object according to the physical object point cloud set;
      generating a first physical object feature set corresponding to the physical object point cloud set according to the first environment image and the physical object point cloud set;
      generating an expanded point cloud image corresponding to the physical object from the second environment image according to the first physical object feature set, and generating a superimposed point cloud image according to the expanded point cloud image and the original point cloud image; and
      generating a transformation matrix according to the original point cloud image and the expanded point cloud image, and superimposing the virtual object to the second environment image according to the superimposed point cloud image and the transformation matrix.

2. The augmented reality processing device of claim 1, wherein the processor is further configured for:
   executing ORB algorithms according to the first environment image and the physical object point cloud set to generate the first physical object feature set corresponding to the physical object point cloud set.

3. The augmented reality processing device of claim 1, wherein the processor is further configured for:
   identifying an object area of the physical object in the second environment image according to the first physical object feature set, and generating the expanded point cloud image corresponding to the physical object in the second environment image from the object area.

4. The augmented reality processing device of claim 3, wherein the processor is further configured for:
   superimposing the expanded point cloud image to a position corresponding to the object area in the original point cloud image to generate the superimposed point cloud image.

5. The augmented reality processing device of claim 3, wherein the processor is further configured for:
   performing ORB algorithms on the object area in the second environment image to generate a second physical object feature set corresponding to the physical object.

6. The augmented reality processing device of claim 5, wherein the processor is further configured for:
   establishing a point cloud correspondence relationship between the physical object point cloud set and the expanded point cloud image according to the first physical object feature set and the second physical object feature set; and
   generating the transformation matrix according to the point cloud correspondence relationship, the physical object point cloud set, and the expanded point cloud image.

7. The augmented reality processing device of claim 6, wherein the processor is further configured for:
- utilizing the transformation matrix to execute geometric transformation on the expanded point cloud image, so as to generate an adjusted expanded point cloud image, and executing distance function processing according to the adjusted expanded point cloud image and the expanded point cloud image to generate a distance value; and
- determining, according to the distance value and a distance threshold, whether to generate an adjusted transformation matrix according to the point cloud correspondence relationship, the physical object point cloud set, and the adjusted expanded point cloud image, so as to superimpose the virtual object on the second environment image according to the superimposed point cloud image and the adjusted transformation matrix.

8. The augmented reality processing device of claim 6, wherein the processor is further configured for:
- calculating a barycenter position corresponding to the physical object point cloud set and a barycenter position corresponding to the expanded point cloud image according to the physical object point cloud set and the expanded point cloud image; and
- generating the transformation matrix according to the point cloud correspondence relationship, the barycenter position corresponding to the physical object point cloud set, and the barycenter position corresponding to the expanded point cloud image.

9. The augmented reality processing device of claim 1, wherein the processor is further configured for:
- utilizing the transformation matrix to execute geometric transformation on the virtual object, so as to generate a transformed virtual object, and superimposing the transformed virtual object on the second environment image according to the superimposed point cloud image.

10. The augmented reality processing device of claim 1, wherein the first environment image and the second environment image respectively correspond to a first capturing time and a second capturing time, wherein the first capturing time is before the second capturing time.

11. An augmented reality processing method, comprising:
- capturing a first environment image and a second environment image, and generating an original point cloud image according to the first environment image and a physical object in the first environment image, wherein the original point cloud image comprises a physical object point cloud set and a physical scene point cloud set which correspond to the physical object, wherein a virtual object is superimposed with the physical object according to the physical object point cloud set;
- generating a first physical object feature set corresponding to the physical object point cloud set according to the first environment image and the physical object point cloud set;
- generating an expanded point cloud image corresponding to the physical object from the second environment image according to the first physical object feature set, and generating a superimposed point cloud image according to the expanded point cloud image and the original point cloud image; and
- generating a transformation matrix according to the original point cloud image and the expanded point cloud image, and superimposing the virtual object to the second environment image according to the superimposed point cloud image and the transformation matrix.

12. The augmented reality processing method of claim 11, wherein the step of generating the first physical object feature set corresponding to the physical object point cloud set according to the first environment image and the physical object point cloud set comprises:
- executing ORB algorithms according to the first environment image and the physical object point cloud set to generate the first physical object feature set corresponding to the physical object point cloud set.

13. The augmented reality processing method of claim 11, wherein the step of generating the expanded point cloud image corresponding to the physical object from the second environment image according to the first physical object feature set comprises:
- identifying an object area of the physical object in the second environment image according to the first physical object feature set, and generating the expanded point cloud image corresponding to the physical object in the second environment image from the object area.

14. The augmented reality processing method of claim 13, wherein the step of generating the superimposed point cloud image according to the expanded point cloud image and the original point cloud image comprises:
- superimposing the expanded point cloud image to a position corresponding to the object area in the original point cloud image to generate the superimposed point cloud image.

15. The augmented reality processing method of claim 13, further comprising:
- performing ORB algorithms on the object area in the second environment image to generate a second physical object feature set corresponding to the physical object.

16. The augmented reality processing method of claim 15, wherein the step of generating the transformation matrix according to the original point cloud image and the expanded point cloud image comprises:
- establishing a point cloud correspondence relationship between the physical object point cloud set and the expanded point cloud image according to the first physical object feature set and the second physical object feature set; and
- generating the transformation matrix according to the point cloud correspondence relationship, the physical object point cloud set, and the expanded point cloud image.

17. The augmented reality processing method of claim 16, wherein the step of generating the transformation matrix according to the original point cloud image and the expanded point cloud image comprises:
- utilizing the transformation matrix to execute geometric transformation on the expanded point cloud image, so as to generate an adjusted expanded point cloud image, and executing distance function processing according to the adjusted expanded point cloud image and the expanded point cloud image to generate a distance value; and
- determining, according to the distance value and a distance threshold, whether to generate an adjusted transformation matrix according to the point cloud correspondence relationship, the physical object point cloud set, and the adjusted expanded point cloud image, so as to superimpose the virtual object on the second environment image according to the superimposed point cloud image and the adjusted transformation matrix.

18. The augmented reality processing method of claim 16, wherein the step of generating the transformation matrix according to the original point cloud image and the expanded point cloud image comprises:
- calculating a barycenter position corresponding to the physical object point cloud set and a barycenter position corresponding to the expanded point cloud image according to the physical object point cloud set and the expanded point cloud image; and
- generating the transformation matrix according to the point cloud correspondence relationship, the barycenter position corresponding to the physical object point cloud set, and the barycenter position corresponding to the expanded point cloud image.

19. The augmented reality processing method of claim 11, wherein the step of superimposing the virtual object to the second environment image according to the superimposed point cloud image and the transformation matrix comprises:
- utilizing the transformation matrix to execute geometric transformation on the virtual object, so as to generate a transformed virtual object, and superimposing the transformed virtual object on the second environment image according to the superimposed point cloud image.

20. The augmented reality processing method of claim 11, wherein the first environment image and the second environment image respectively correspond to a first capturing time and a second capturing time, wherein the first capturing time is before the second capturing time.

\* \* \* \* \*